US008417524B2

(12) United States Patent  
Deshmukh et al.

(10) Patent No.: US 8,417,524 B2
(45) Date of Patent: Apr. 9, 2013

(54) ANALYSIS OF THE TEMPORAL EVOLUTION OF EMOTIONS IN AN AUDIO INTERACTION IN A SERVICE DELIVERY ENVIRONMENT

(75) Inventors: Om D. Deshmukh, New Delhi (IN); Chitra Dorai, Hawthorne, NY (US); Shailesh Joshi, New Milford, CT (US); Maureen E. Rzasa, Phoenix, AZ (US); Ashish Verma, New Delhi (IN); Karthik Visweswariah, Bangalore (IN); Gary J. Wright, Henderson, NV (US); Sai Zeng, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 12/704,172

(22) Filed: Feb. 11, 2010

(65) Prior Publication Data

US 2011/0196677 A1    Aug. 11, 2011

(51) Int. Cl.
| | |
|---|---|
| *G10L 15/06* | (2006.01) |
| *G10L 11/04* | (2006.01) |
| *G10L 11/06* | (2006.01) |
| *G10L 19/06* | (2006.01) |
| *G10L 15/00* | (2006.01) |
| *G10L 17/00* | (2006.01) |
| *G10L 11/00* | (2006.01) |
| *G10L 21/00* | (2006.01) |

(52) U.S. Cl. ........ 704/243; 704/207; 704/208; 704/210; 704/214; 704/215; 704/231; 704/246; 704/235; 704/257; 704/270; 704/270.1; 704/275

(58) Field of Classification Search ................... 704/207, 704/208, 210, 214, 215, 231, 246, 275, 235, 704/257, 270, 270.1, 243
See application file for complete search history.

(56) References Cited

U.S. PATENT DOCUMENTS

| | | | | |
|---|---|---|---|---|
| 6,112,172 | A * | 8/2000 | True et al. ...................... 704/235 |
| 6,151,571 | A * | 11/2000 | Pertrushin ...................... 704/209 |
| 6,185,527 | B1 * | 2/2001 | Petkovic et al. ............... 704/231 |
| 6,542,602 | B1 * | 4/2003 | Elazar ...................... 379/265.06 |
| 6,922,466 | B1 * | 7/2005 | Peterson et al. ........... 379/88.09 |
| 7,191,133 | B1 * | 3/2007 | Pettay ............................ 704/270 |
| 7,596,498 | B2 * | 9/2009 | Basu et al. .................... 704/270 |
| 7,664,641 | B1 * | 2/2010 | Pettay et al. .................. 704/251 |
| 7,716,048 | B2 * | 5/2010 | Pereg et al. ................... 704/246 |
| 7,739,115 | B1 * | 6/2010 | Pettay et al. .................. 704/270 |
| 7,752,043 | B2 * | 7/2010 | Watson ........................ 704/235 |

(Continued)

OTHER PUBLICATIONS

Stolcke et al., "Automatic linguistic segmentation of conversational speech", Proc. Intl. Conf. on Spoken Language Processing, vol. 2, pp. 1005-1008, 1996.*

(Continued)

*Primary Examiner* — Edgar Guerra-Erazo
(74) *Attorney, Agent, or Firm* — Yee & Associates, P.C.; Louis J. Percello

(57) ABSTRACT

Analyzing an audio interaction is provided. At least one change in an emotion of a speaker in an audio interaction and at least one aspect of the audio interaction are identified. The at least one change in an emotion is analyzed in conjunction with the at least one aspect to determine a relationship between the at least one change in an emotion and the at least one aspect, and a result of the analysis is provided.

19 Claims, 4 Drawing Sheets

U.S. PATENT DOCUMENTS

| | | | | |
|---|---|---|---|---|
| 7,885,813 | B2* | 2/2011 | Blair et al. | 704/246 |
| 2003/0078782 | A1* | 4/2003 | Blair | 704/270.1 |
| 2003/0154072 | A1* | 8/2003 | Young et al. | 704/9 |
| 2004/0236580 | A1* | 11/2004 | Bennett | 704/270.1 |
| 2005/0108775 | A1* | 5/2005 | Bachar et al. | 725/135 |
| 2007/0043608 | A1* | 2/2007 | May et al. | 705/10 |
| 2007/0071206 | A1* | 3/2007 | Gainsboro et al. | 379/168 |
| 2008/0005051 | A1* | 1/2008 | Turner et al. | 706/20 |
| 2008/0249764 | A1* | 10/2008 | Huang et al. | 704/9 |
| 2009/0112892 | A1* | 4/2009 | Cardie et al. | 707/100 |
| 2009/0132442 | A1* | 5/2009 | Subramaniam et al. | 706/12 |
| 2009/0193011 | A1* | 7/2009 | Blair-Goldensohn et al. | 707/5 |
| 2009/0193328 | A1* | 7/2009 | Reis et al. | 715/231 |
| 2010/0070276 | A1* | 3/2010 | Wasserblat et al. | 704/243 |

OTHER PUBLICATIONS

"Determining the Sentiment of Opinions," Soo-Min Kim et al., COLING, pp. 1367-1373, 2004.*

* cited by examiner

ANALYSIS OF THE TEMPORAL EVOLUTION OF EMOTIONS IN AN AUDIO INTERACTION IN A SERVICE DELIVERY ENVIRONMENT

BACKGROUND

1. Field

The disclosure relates generally to a computer implemented method, a data processing system, and a computer readable storage medium having a computer program product encoded thereon. More specifically, this disclosure relates to a computer implemented method, a data processing system, and a computer readable storage medium having a computer program product encoded thereon for analyzing the temporal evolution of emotions in an audio interaction in a service delivery environment.

2. Description of the Related Art

Previous work in automatic analysis of business conversations in a contact center setting addresses the issue of detecting which consumers were happy, neutral or angry using a combination of acoustic and/or lexical features. The main outcome of this previous work is a global emotion-indicator over an entire conversation.

Most of the previous work detects emotion in isolation and does not analyze aspects of the telephone call in conjunction with the changes in the emotion to derive insights as to what might have led to changes in emotion and what might be done by agents to convert negative-sentiment consumers to positive-sentiment consumers.

SUMMARY

According to one embodiment of the present disclosure, a method for analyzing an audio interaction is provided. At least one change in an emotion of a speaker in an audio interaction and at least one aspect of the audio interaction are identified. The at least one change in an emotion is analyzed in conjunction with the at least one aspect to determine a relationship between the at least one change in an emotion and the at least one aspect, and a result of the analysis is provided.

DETAILED DESCRIPTION

Figure 1:
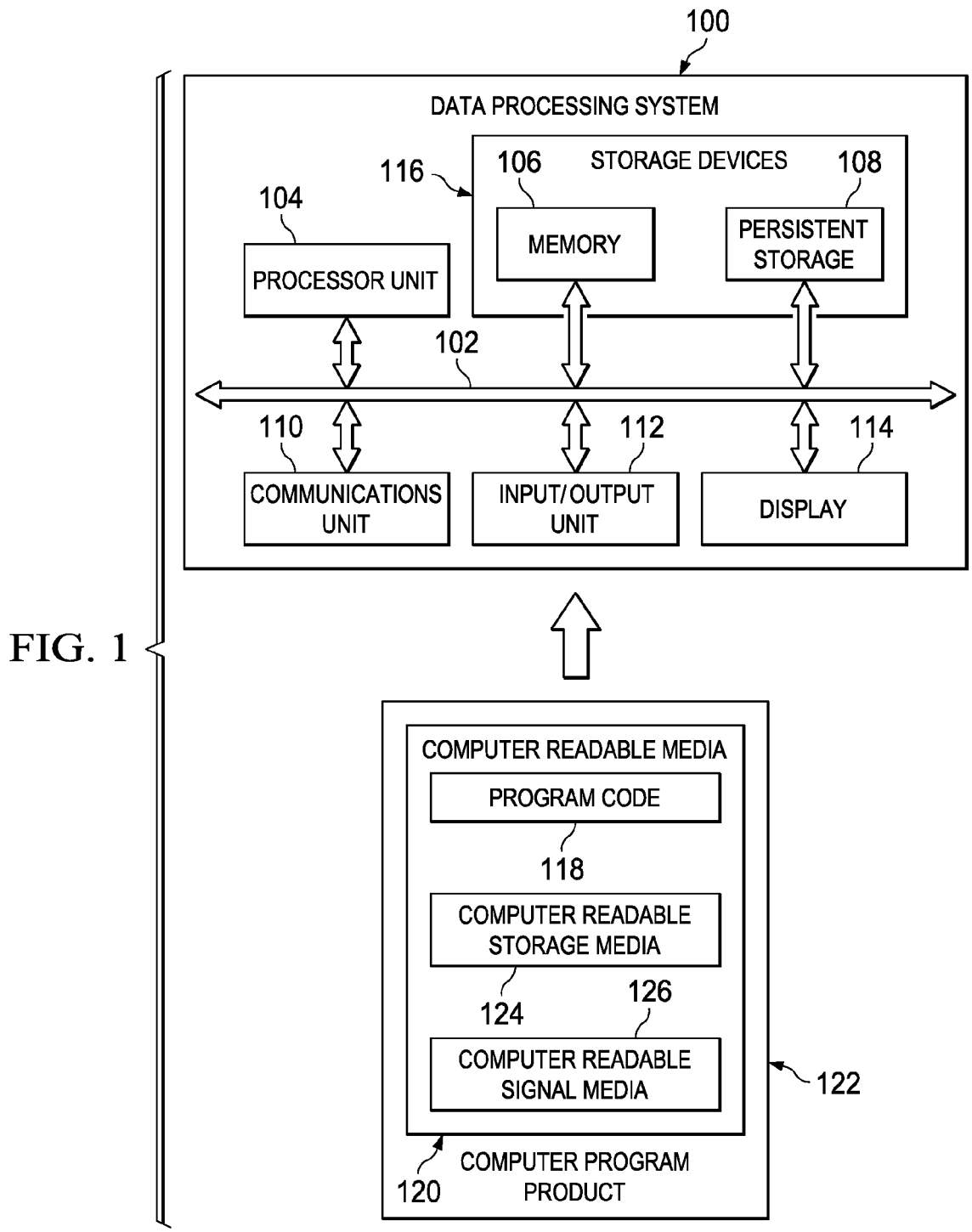
FIG. 1 is an illustration of a block diagram of a data processing system in accordance with an illustrative embodiment.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures and in particular with reference to FIG. 1, an exemplary diagram of a data processing environment is provided in which illustrative embodiments may be implemented. It should be appreciated that FIG. 1 is only exemplary and is not intended to assert or imply any limitation with regard to the environments in which different embodiments may be implemented. Many modifications to the depicted environment may be made.

FIG. 1 is an illustration of a block diagram of a data processing system in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems, in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory, or any other suitable volatile or non-volatile storage device. Persistent storage 108 may take various forms, depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 may be removable. For example, a removable hard drive may be used for persistent storage 108.

Communications unit 110, in these examples, provides for communication with other data processing systems or devices. In these examples, communications unit 110 is a network interface card. Communications unit 110 may provide communications through the use of either or both physical and wireless communications links.

Input/output unit 112 allows for the input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications, and/or programs may be located in storage devices 116, which are in communication with processor unit 104 through communications fabric 102. In these illustrative examples, the instructions are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code, in the different embodiments, may be embodied on different physical or computer readable storage media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122. In one example, computer readable media 120 may be computer readable storage media 124 or computer readable signal media 126. Computer readable storage media 124 may include, for example, an optical or magnetic disc that is inserted or placed into a drive or other device that is part of persistent storage 108 for transfer onto a storage device, such as a hard drive, that is part of persistent storage 108. Computer readable storage media 124 also may take the form of a persistent storage, such as a hard drive, a thumb drive, or a flash memory that is connected to data processing system 100. In some instances, computer readable storage media 124 may not be removable from data processing system 100.

Alternatively, program code 118 may be transferred to data processing system 100 using computer readable signal media 126. Computer readable signal media 126 may be, for example, a propagated data signal containing program code 118. For example, computer readable signal media 126 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system through computer readable signal media 126 for use within data processing system 100. For instance, program code stored in a computer readable storage media in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, data processing system 100 may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108, and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Figure 2:
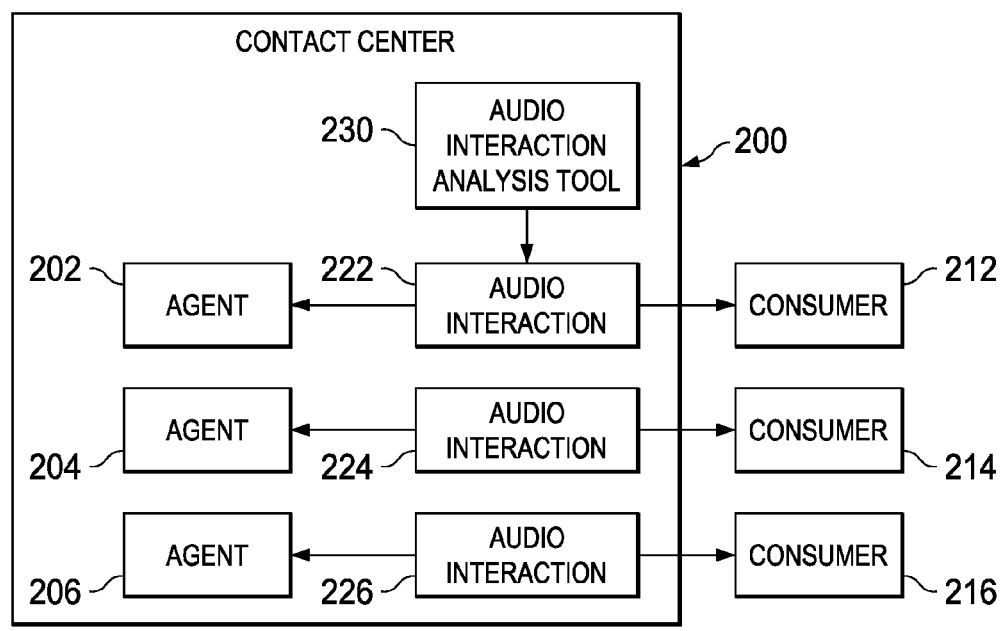
FIG. 2 is an illustration of a block diagram of a contact center in accordance with an illustrative embodiment.

FIG. 2 is an illustration of a block diagram of a contact center in accordance with an illustrative embodiment. The contact center is generally designated by reference number 200, and may be a contact center maintained by an enterprise such as a company or other business entity, a university or a governmental agency. The term "contact center" as used herein is a point in an enterprise from which consumer contacts are managed. The contact center may be a department within the enterprise or it may be a separate entity utilized by the enterprise.

One function of a contact center is to receive telephone calls from consumers and to transmit telephone calls to consumers. For example, an incoming telephone call to the contact center may request product support or information concerning a product or service provided by the enterprise, or may be a complaint about a product or service provided by the enterprise. An outgoing call from the contact center may, for example, include a telemarketing call, a service call, or a debt collection call.

Contact center 200 may include a plurality of contact center agents. Three agents 202, 204 and 206 are illustrated in FIG. 2, however, it should be understood that this is intended to be exemplary only as contact center 200 may have any number of agents from one agent to many hundreds of agents. Each contact center agent 202, 204 and 206 may communicate with a consumer 212, 214 and 216, respectively. The term "consumer" as used herein may include a customer of the enterprise, a potential customer of the enterprise, or any other entity that may have any reason to communicate with the enterprise.

In the illustrative embodiments described herein, the communication between a contact center agent and a consumer is referred to as an "audio interaction." For example, FIG. 2 illustrates audio interaction 222 between call center agent 202 and consumer 212, audio interaction 224 between call center agent 204 and consumer 214, and audio interaction 226 between call center agent 206 and consumer 216. Typically, an audio interaction will be a telephone conversation. It should be understood, however, that illustrative embodiments may also include other forms of audio interaction.

FIG. 2 also illustrates an audio interaction analysis tool 230. Audio interaction analysis tool 230 analyzes the temporal trajectory of various emotions of a given telephone conversation, for example, audio interaction 222, between a contact center agent in the contact center and a consumer in conjunction with various aspects of the contact center/consumer interaction to detect what actions/phrases might have caused or otherwise influenced the emotional state of the consumer or the agent. Such aspects may, for example, include the number of repeat calls by the consumer, the agent's empathy with the consumer's situation, frequency and duration of the consumer being placed on hold, and so on. Illustrative embodiments also address the issue of collating the results of the analysis across different calls between different agents and consumers to derive insights that can propose best practices to improve the negative-to-positive sentiment conversion rate of conversations.

Figure 3:
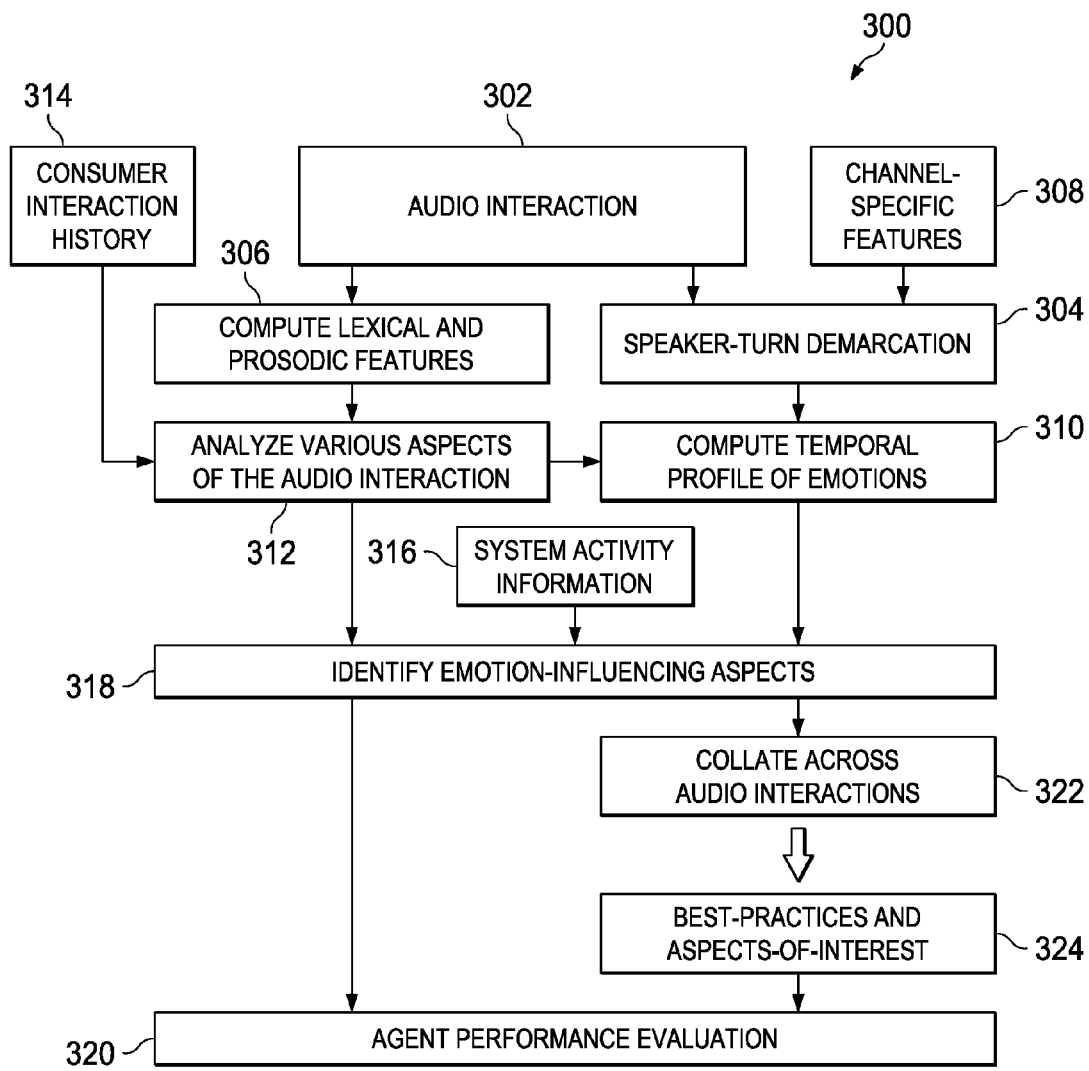
FIG. 3 is an illustration of a block diagram that depicts a system for analyzing an audio interaction between a contact center agent and a consumer in accordance with an illustrative embodiment.

FIG. 3 is an illustration of a block diagram that depicts a system for analyzing an audio interaction between a contact center agent and a consumer in accordance with an illustrative embodiment. The system is generally designated by reference number 300, and, in the illustrative embodiment, analyzes an audio interaction 302, for example, a telephone conversation, between a contact center agent of an enterprise and a consumer of the enterprise. The audio interaction may be an ongoing conversation in real-time or a previously recorded conversation, and may have been initiated by either the agent or the consumer.

Audio interaction 302 is monitored to detect a change in the speaker (speaker-turn demarcation) during audio interaction 302 as shown at 304 so that the identity of the current speaker may always be known. In this regard, it is assumed that the identity of the call center agent participating in audio interaction 302 being analyzed is known. It is also desirable that the identity of the consumer participating in audio interaction 302 be known, at least to the extent of enabling a particular consumer to be distinguished from other consumers. It is desirable to identify the current speaker at any point in the audio interaction 302 so that changes in the emotions of both the contact center agent and the consumer can be separately tracked. This may improve the overall accuracy of the emotion detection and provide valuable insights into the audio interaction.

The detection of a change in the current speaker in the audio interaction may be accomplished using one or more of prosodic features and/or lexical features. Prosodic features may include features such as pitch, energy contour, stress and other features that capture specific nuances by analyzing the physical speech signal; and lexical features may include features such as different sets of words that are typically spoken by the consumer and the contact agent. For example, a contact agent may use words such as "welcome to this contact center", while a consumer may use words such as "I am frustrated" or "I am facing a problem with this product." Accordingly, lexical and prosodic features are computed as shown at 306 for use in determining changes in the current speaker.

In addition, channel specific features 308 may also be used to assist in identifying changes in the current speaker. Channel-specific features may include volume, background noise and other non-speech cues that typically vary across the consumer and contact agent's locations and that can be used to help identify who is speaking at any particular time.

A temporal profile of emotions for each of the consumer and the contact agent can then be computed as indicated at 310. Temporal variations in emotion can be detected by a combination of the following types of features:

1. Lexical features, for example, the use of different sets of words/N-grams to indicate different emotions. Relative numbers of these N-grams in certain time windows can indicate temporal variation in emotion. An N-gram is a subsequence of N items from a given sequence. The items in question can, for example, be syllables, letters or words.

2. Prosodic features, for example, the use of relative values of pitch, energy contour, stress and other features computed directly from the speech signal that can also help in tracking changes in emotion over time.

Various aspects of the audio interaction are also analyzed as indicated at 312. For example, the locations in the audio interaction where emotions change drastically may be analyzed to provide a dynamic detection of "interesting" call aspects. Also, the agent's system activity may be analyzed to detect the agent's actions in the vicinity of a negative/positive emotion of the consumer. This is done to identify the agent's actions that caused, or were the effect of, the consumer's negative/positive emotion. This analysis will help in identifying parts of the audio interaction process that may need special attention.

The agent's speech in the vicinity of the customer's positive/negative emotion may also be analyzed. This analysis will assist in identifying phrases that have the most effect on, or are the effect of, the consumer's emotion or other reaction. This analysis may also help to establish best practices and or in modifying protocols.

The analysis of the various aspects of the audio interaction may include an initial list of "interesting call-aspects" based on domain knowledge and discussions with experts. Such interesting call aspects may include hold-time, caller history (e.g., the number of repeat calls made by the consumer), the agent's tone and language, transfers, discounts, resolutions and the like.

Call aspects, such as those described above, if any, are located in audio interaction 302. Hold time may be located using speech-silence analysis. Information about the caller history may be obtained by an analysis of the beginning of the audio interaction and/or by system logs, generally designated as consumer interaction history 314, and system activity information 316. Transfers can be detected by a combination of speech-based analysis and speaker change detection.

The computed temporal profile of emotions 310 of audio interaction 302 are then analyzed in conjunction with the various aspects 312 of the audio interaction to determine a relationship between the changes in emotion that occur during the audio interaction and the various aspects, and this analysis permits emotion-influencing aspects of the audio interaction to be identified as shown at 318. It may, for example, be determined that certain phrases uttered by the agent, or the consumer being placed on hold for an excessive period of time, cause the consumer to become angry. It may also be determined that certain statements made by the consumer may cause the agent to become angry or unhappy. It could also help in determining which problems, when solved, lead to most satisfactory/positive emotions from consumers.

Once the emotion influencing aspects of audio interaction 302 have been identified, this information may be used to assist in evaluating agent performance as indicated at 320. In addition, as shown at 322, results of the analyses of a plurality of audio interactions between different agents and consumers may be collated to help to establish best practices and aspects-of-interest as shown at 324. For example, the co-occurrences of emotion changes and call-aspects can be collated across telephone calls to identify positive practices in the overall audio interaction process, to highlight opportunities to improve process efficiency, to identify troubled or trouble-making customers, and for numerous other purposes. This analysis can be used to improve the overall efficiency of the audio interaction process. For example, if many regions of "negative" customer emotions are followed by the agent performing a certain corrective action on his/her system (for example, a password reset), then the password reset mechanism should be made more user friendly in order to improve efficiency.

Figure 4:
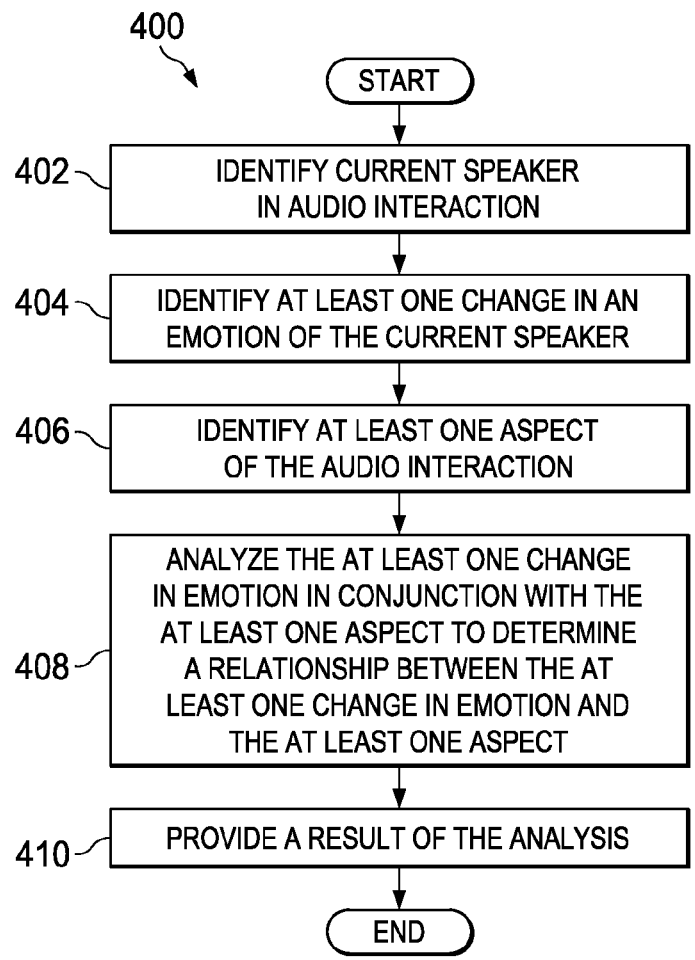
FIG. 4 is an illustration of a flowchart of a process for analyzing an audio interaction in accordance with an illustrative embodiment.

FIG. 4 is an illustration of a flowchart that illustrates a process for analyzing an audio interaction according to an illustrative embodiment. The process is generally designated by reference number 400, and in the illustrative embodiment described herein, the audio interaction may be a telephone conversation between an agent in a contact center of an enterprise and a consumer.

The process begins by identifying a current speaker in the audio interaction (Step 402). In this regard, it is assumed that the identities of the participants of the audio interaction are known, such that the current speaker may be identified by identifying changes in the speaker during the audio interaction by computing lexical and prosodic features of the audio interaction and/or by identifying channel-specific features of the audio interaction. At least one change in an emotion of the current speaker is then identified (Step 404). The change in emotion may, for example, be from happy to angry or sad, or from angry or sad to happy or another change in emotion. The changes in emotion can be identified, for example, by using lexical features such as sets of words/N-grams that indicate different emotions and/or prosodic features such as relative values of pitch, energy contour, stress and the like computed directly from the speech signal.

At least one aspect of the audio interaction is also identified (Step 406). The at least one aspect may include aspects that are based on domain knowledge and discussions with experts and may include aspects such as hold time (the length of time a consumer is placed on hold), consumer history (the number of times the particular consumer has called the contact center), periods of silence in the audio interaction, the number of times the consumer has been transferred to another agent, resolutions of previous calls, phrases used during the audio interaction and numerous other aspects. In general, the aspects that are identified are those that are recognized as possibly causing or otherwise influencing a change in an emotion of a speaker.

The at least one change in emotion is then analyzed in conjunction with the at least one identified aspect to determine a relationship between the at least one change in emotion and the at least one aspect (Step 408). The analysis is performed to identify those aspects that are "emotion-influencing" with respect to the audio interaction, i.e., to determine those aspects that may have caused or otherwise influenced the at least one change in emotion. A result of the analysis is then provided (Step 410) and the process ends. The result of the analysis may, for example, be a performance evaluation of the agent participating in the audio interaction or an identification of a way in which the audio interaction process may be improved or made more efficient.

Figure 5:
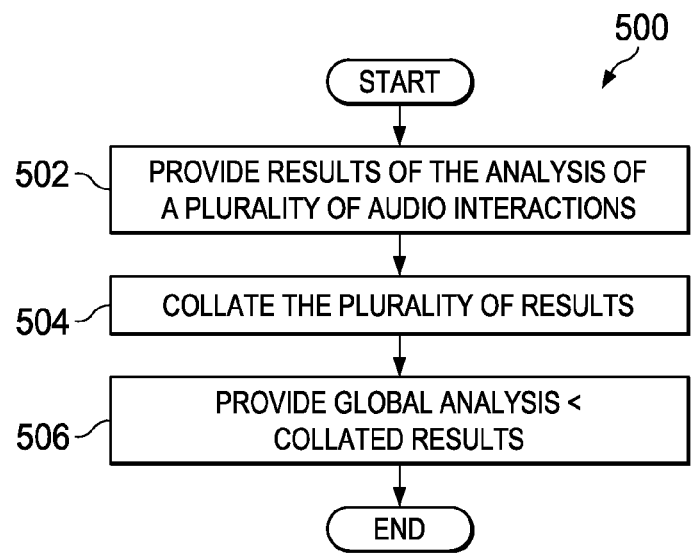
FIG. 5 is an illustration of a flowchart of a process for providing a global analysis of the operation of a contact center in accordance with an illustrative embodiment.

FIG. 5 is an illustration of a flowchart of a process for providing a global analysis of the operation of a contact center in accordance with an illustrative embodiment. The process is generally designated by reference number 500, and begins by providing results of the analysis of a plurality of audio interactions (Step 502). The plurality of audio interactions may include audio interactions between a particular agent and different consumers, as well as audio interactions between different agents in the contact center and various consumers, and the results of each audio interaction may be obtained by performing the process illustrated in FIG. 4 for each of the different audio interactions. The plurality of results are collated (Step 504), and a global analysis of the collated results are provided (Step 506).

The global analysis enables the co-occurrences of emotion changes and call aspects to be collated across plural calls to identify positive practices in the overall audio interaction process, to highlight opportunities to improve process efficiency, to identify consistently under par or above par agents, to identify trouble-making consumers and the like. This analysis can be used to improve the overall efficiency of the audio interaction process. For example, if it is learned from the global analysis that many regions of negative consumer emotions are followed by an agent performing a certain corrective action on his/her system (like a password reset), then the password reset mechanism can be changed to be more user friendly.

Illustrative embodiments thus provide a computer implemented method for analyzing an audio interaction. At least one change in an emotion of a speaker in an audio interaction and at least one aspect of the audio interaction are identified. The at least one change in an emotion is analyzed in conjunction with the at least one aspect to determine a relationship between the at least one change in an emotion and the at least one aspect, and a result of the analysis is provided.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for analyzing an audio interaction, the method comprising:
 identifying, by a computer, a change in an emotion of a speaker in an audio interaction;

identifying, by the computer, aspects of the audio interaction;

analyzing, by the computer, the change in the emotion of the speaker in conjunction with the aspects of the audio interaction;

determining, by the computer, a relationship between the change in the emotion of the speaker and the aspects of the audio interaction based on the computer analyzing the change in the emotion of the speaker in conjunction with the aspects;

identifying, by the computer, an emotion-influencing aspect of the audio interaction that caused the change in the emotion of the speaker based on the computer determining the relationship between the change in the emotion of the speaker and the aspects of the audio interaction; and providing, by the computer, the emotion-influencing aspect identified in the audio interaction that caused the change in the emotion of the speaker.

2. The method of claim 1, wherein the speaker comprises a current speaker, further comprising:
identifying, by the computer, the current speaker in the audio interaction.

3. The method of claim 2, wherein identifying the current speaker in the audio interaction, comprises:
detecting, by the computer, a change in the speaker by detecting channel-specific non-speech features in the audio interaction.

4. The method of claim 1, wherein the identifying of the change in the emotion of the speaker in the audio interaction comprises identifying, by the computer, an interaction history of the speaker that includes a number of repeat calls made by the speaker obtained by analysis of system logs.

5. The method of claim 1, wherein the audio interaction is a telephone conversation.

6. The method of claim 1, wherein the audio interaction comprises an audio interaction between an agent in a contact center of an enterprise and a consumer.

7. The method of claim 6 further comprising:
collating, by the computer, the audio interaction with a plurality of further audio interactions between the agent and a plurality of consumers to improve efficiency of the agent.

8. The method of claim 6 further comprising:
analyzing, by the computer, a co-location of emotion changes and aspects over a plurality of audio interactions to propose best practices and to evaluate performance of agents in the contact center.

9. A computer program product stored in a computer readable storage device having computer usable program code embodied therein that is executable by a computer for analyzing an audio interaction, the computer program product comprising:
computer usable program code for identifying a change in an emotion of a speaker in an audio interaction;
computer usable program code for identifying aspects of the audio interaction;
computer usable program code for analyzing the change in the emotion of the speaker in conjunction with the aspects of the audio interaction;
computer usable program code for determining a relationship between the change in the emotion of the speaker and the aspects of the audio interaction based on the analyzing of the change in the emotion of the speaker in conjunction with the aspects;
computer usable program code for identifying an emotion-influencing aspect of the audio interaction that caused the change in the emotion of the speaker based on the determining of the relationship between the change in the emotion of the speaker and the aspects of the audio interaction; and
computer usable program code for providing the emotion-influencing aspect identified in the audio interaction that caused the change in the emotion of the speaker.

10. The computer program product of claim 9, wherein the speaker comprises a current speaker, further comprising:
computer usable program code for identifying the current speaker in the audio interaction.

11. The computer program product of claim 10, wherein the computer usable program code for identifying the current speaker in the audio interaction, comprises:
computer usable program code for detecting a change in the speaker by detecting channel-specific non-speech features in the audio interaction.

12. The computer program product of claim 9, wherein the computer usable program code for identifying the change in the emotion of the speaker in the audio interaction comprises computer usable program code for identifying an interaction history of the speaker that includes a number of repeat calls made by the speaker obtained by analysis of system logs.

13. The computer program product of claim 9, wherein the audio interaction is a telephone conversation between an agent in a contact center of an enterprise and a consumer.

14. The computer program product of claim 13, and further comprising:
computer usable program code for collating the audio interaction with a plurality of further audio interactions between the agent and a plurality of consumers to improve efficiency of the agent.

15. A computer system for analyzing an audio interaction, the computer system comprising:
a storage device storing instructions, and
a processor for executing the instructions to:
identify a change in an emotion of a speaker in an audio interaction;
identify aspects of the audio interaction;
analyze the change in the emotion of the speaker in conjunction with the aspects of the audio interaction;
determine a relationship between the change in the emotion of the speaker and the aspects of the audio interaction based on analyzing the change in the emotion of the speaker in conjunction with the aspects;
identify an emotion-influencing aspect of the audio interaction that caused the change in the emotion of the speaker based on determining the relationship between the change in the emotion of the speaker and the aspects of the audio interaction; and
provide the emotion-influencing aspect identified in the audio interaction that caused the change in the emotion of the speaker.

16. The computer system of claim 15, wherein the speaker comprises a current speaker, the processor further executing the instructions to identify the current speaker in the audio interaction.

17. The computer system of claim 16, wherein the processor executing the instructions to identify the current speaker, comprises the processor executing the instructions to detect a change in the speaker by detecting channel-specific non-speech features in the audio interaction.

18. The computer system of claim 15, wherein the processor executing the instructions to identify the change in the emotion of the speaker in the audio interaction comprises the processor executing the instructions to identify an interaction history of the speaker that includes a number of repeat calls made by the speaker obtained by analysis of system logs.

19. The computer system of claim 15, wherein the audio interaction is a telephone conversation between an agent in a contact center of an enterprise and a consumer.

\* \* \* \* \*